United States Patent [19]

Winkie

[11] Patent Number: 4,735,107
[45] Date of Patent: Apr. 5, 1988

[54] PEDAL ARRANGEMENT

[76] Inventor: John Winkie, 4 Dennis Avenue, Manurewa, Auckland, New Zealand

[21] Appl. No.: 884,903

[22] Filed: Jul. 14, 1986

Related U.S. Application Data

[63] Continuation of Ser. No. 654,658, Sep. 26, 1984, abandoned.

[30] Foreign Application Priority Data

Sep. 28, 1983 [NZ] New Zealand .......................... 205778

[51] Int. Cl.[4] ............................ G05G 1/14; A43B 5/00
[52] U.S. Cl. .................................... 74/534.6; 74/594.4; 36/131
[58] Field of Search ............................. 74/594.6, 594.4; 280/613; 36/131; 24/590, 591, 595, 697

[56] References Cited

U.S. PATENT DOCUMENTS

| 550,409 | 11/1895 | Hanson | 74/594.6 |
| 3,788,163 | 1/1974 | Gause et al. | 74/594.6 |
| 3,858,996 | 1/1975 | Jarvis | 24/590 |
| 4,377,952 | 3/1983 | Gamondes | 74/594.6 |
| 4,488,453 | 12/1984 | Drugen et al. | 74/594.6 |

FOREIGN PATENT DOCUMENTS

| 15803 | 9/1980 | European Pat. Off. | 74/594.6 |
| 0094276 | 11/1983 | European Pat. Off. | 36/131 |
| 0193472 | 9/1986 | European Pat. Off. | 36/131 |
| 3149345 | 6/1983 | Fed. Rep. of Germany | 74/594.6 |
| 3414971 | 10/1985 | Fed. Rep. of Germany | 36/131 |
| 993958 | 11/1951 | France | 74/594.6 |
| 2561502 | 9/1985 | France | 36/131 |
| 2568213 | 1/1986 | France | 36/131 |
| WO80/01056 | 5/1980 | PCT Int'l Appl. | 74/594.6 |

Primary Examiner—Gary L. Smith
Assistant Examiner—Vinh Luong
Attorney, Agent, or Firm—Holman & Stern

[57] ABSTRACT

A pedal arrangement for releasable engagement between a cycle pedal and a cyclist's shoe wherein the pedal is provided with engagement members on a top surface thereof preferably in the form of upstanding lugs and, cooperating engagement members are provided in a lower surface of a cyclist's shoe preferably in the form of recessed rabbets, the lugs and rabbets interengaging one with the other, in a releasable manner. The pedal is also provided with a resilient retaining member which extends upwardly of the top surface of the pedal on one side thereof and is in the form of an elongate spring portion with an upwardly extending abutment member at one end thereof. In use, the spring portion and abutment member allow the shoe to be held in an engaged position relative to the pedal. A positive and predetermined movement of the shoe relative to the retaining member causes the retaining member to move out of position allowing the shoe to be released from engagement with the pedal.

14 Claims, 2 Drawing Sheets

PEDAL ARRANGEMENT

This is a continuation of application Ser. No. 654,658, filed Sept. 26, 1984 now abandoned.

BACKGROUND OF THE INVENTION

Field of the Invention

This invention relates to an arrangement for the releaseable engagement between a cycle pedal and a cyclist's shoe.

Description of the Prior Art

It has always been a problem with cycling, and in particular with racing and touring cycling, that means must be provided for making sure that there is a relatively positive location between the shoes of a cyclist and the pedals. In other words, it is important that means be provided to make sure that the shoes of a cyclist do not accidentally slip or move off the pedals, this causing injury, loss of time or in the case of accidents, damage to cycles and/or injury. At the same time it has been desirable to provide means whereby shoes can be quickly disengaged from pedals; for example in the case of accidents.

In various arrangements used for some years, cyclists have used restraints in the form of toe clips, in conjunction with quick release straps. There have however been a number of disadvantages with these arrangements, in that in addition to the weight of the straps, buckles and the like, it has been necessary for the cyclist to adjust the arrangements by hand. For example, a cyclist may wish to alter the pressure or tightness of the strap, depending on the activity concerned. The cyclist may for example wish to tighten the strap, before a hill climb or sprint, whereas in other cases, it may be desired to loosen the strap somewhat. Thus, it is necessry for the cyclist to lean down from the cycle, and to adjust these straps by hand, this being time consuming and indeed energy consuming. Such action also diverts the attention of the cyclist which can be dangerous and result in accidents.

In addition to the above, release straps used up until this time can restrict blood circulation in the feet of cyclists and can also result in skin and bone problems. One further and important disadvantage is that in the case of an accident, the feet of the cyclist are securely attached to the pedals of the cycle by straps, which as indicated require hand adjustment for tightening, loosening and indeed removal. It will be appreciated therefore, that in the case of an accident, it is very difficult for cyclists to remove their feet from the pedals. This can contribute therefore to serious injury in the case of accidents.

The above problems have been recognized previously and certain attempts have been made to provide an arrangement for the straight forward and efficient releaseable inter-engagement of cycle shoes and pedals. The arrangements suggested and disclosed have however suffered from a number of real disadvantages.

One such arrangement is disclosed in Italian patent specification No. 60971/80. In that specification an arrangement is disclosed which involves the attachment of an appropriate plate to the pedal of a cycle, a corresponding attachment being placed on the sole or underside of the shoe. Components are provided on both the pedal and underside of the cyclists shoe, so that on engagement therebetween, the shoe is releaseably held in position relative to the pedal. This is possible by an at least partial rotational movement of the shoe relative to the pedal. The disclosed arrangement does however involve a number of separate integers and in particular a spring loaded ball type securing means which, following location of the shoe relative to the pedal exerts pressure on the connecting members of the shoe.

As will be appreciated, this is relatively complicated in its operation and is expensive to manufacutre. In addition the spring loaded ball bearing operated within an appropriate channel or bore, attracts dirt, extraneous matter and the like, and thus can become ineffective. It is also a disadvantage to have a number of moving parts in such an arrangment, as there are maintenance problems. In addition no satisfactory arrangement is provided to adequately prevent or minimise involuntary, accidental and unintentional removal of shoes from pedals. In addition, the arrangement for attaching the shoe to the pedal incorporates means which extend downwardly and outwardly from the lower surface of the shoe. Thus, when a cyclist has disengaged his shoe from a pedal, he would not be able to walk normally because of the separate integers and components extending downwardly from the underside of the shoe. This would cause extreme discomfort and would not be practical in use. As will be appreciated, it is important, if at all possible, to provide a shoe which on disengagement has a relatively flat, smooth or planar surface to allow for normal walking or movement.

A further arrangment is known and disclosed in European patent specification No. 0,082,229. In that specification, a cycle shoe is disclosed which has a number of downwardly extending sprigs or engagement members, which engage within a complicated arrangement associated with the pedal of a cycle, to allow for engagement therebetween. Again however, the European Pat. No. 0,082,229 is detailed and complex in operation and includes a number of separate and related integers which are necessary for stated operation. As stated the shoe disclosed has downwardly extending sprigs or attachment members which again make it very difficult for a cyclist to walk or move normally once the cyclist has dismounted from the cycle.

European patent specification No. 0,015,803 discloses yet a further arrangement, which provides a recess in the sole of a cyclist's shoe which must engage with an engagement member upstanding from a surface of a pedal. However, the arrangement of the European specification No. 0,015,803 requires a number of separate integers to be attached to the pedal and is thus complicated and time consuming in manufacture and assembly.

European patent specification No. 0,063,542 discloses yet a further arrangement, but includes an attachment which extends downwardly to a substantial extent from the lower surface or sole of a cycle shoe, thus making it very didfficult if not impossible for normal movement or walking of a cyclist, once he has dismounted from a cycle.

Further arrangements are published in French patent specifications Nos. 2,432,427 and 2,279,607. In these patent specifications, alternative arrangements of mounting shoes to pedals are disclosed, but such arrangements require a number of separate components and integers, and would also make the use of a cycle shoe for walking, (following demounting from a cycle), most difficult and uncomfortable.

Further known arrangements are disclosed in U.S. Pat. Nos. 550,409; 3,788,163 and 4,377,952. These arrangements however include a number of different integers, which require attachment to the pedal or alternatively relate to the attachment of the cycle shoe to the pedal, and thus are time consuming to operate and expensive to manufacture and in some cases repair. As indicated above, it is a disadvantage with many of the known arrangements that the attachments include engagement means on the soles of the shoes which extend downwardly therefrom thus making it very difficult for a cyclist to move or walk anything like normally, once the cyclist has dismounted from the cycle.

In addition, in many of the arrangements disclosed and described up until this time, the engagement between the shoe and pedal is such that while in some cases swift and easy engagement is possible between the shoe and pedal, such arrangements are also able to be disengaged very easily; such as on the slight or unintentional movement of the foot of a cyclist or on a cycle passing over a bumpy ground or obstacle. Thus, it will be appreciated that it is a particular disadvantage of a number of the known arrangements that involuntary disengagement between the shoe and pedal can occur against the wishes of the cyclist. As will be appreciated, this is particularly dangerous and can cause accidents and injury.

The present invention sets out to provide an arrangement whereby a positive and releaseable engagement is provided between a cyclist's shoe and a cycle pedal, which goes someway towards ovrecoming or at least minimizing problems and disadvantages identified up until this time.

Other objects of this invention will become apparent from the following description.

BRIEF SUMMARY OF THE PRESENT INVENTION

According to one aspect of this invention there is provided a cycle pedal adapted for releaseable interengagement with an underside of a cyclist's shoe; said pedal including spaced apart engagement means adapted in use to releaseably engage with engagement means provided on the underside of said shoe; the pedal being provided with resilient retaining means on at least one side thereof.

According to a further aspect of this invention, there is provided an arrangement for the engagement of a cyclist's shoe to a cycle pedal; said pedal and said shoe being provided with spaced apart engagement means to allow for releaseable inter-engagement between and relative to said pedal and shoe; the pedal being provided with resilient retaining means on at least one side thereof.

According to a further aspect of this invention there is provided an arrangement for engagement of a cyclist's shoe to a cycle pedal; said pedal and said shoe being provided with spaced apart engagement means to allow for releaseable inter-engagement therebetween; the pedal being provided with integrally formed and spaced apart lugs, extending upwardly from a surface of said pedal; resilient retaining means being provided and including an elongate spring portion at a an end of the pedal, defined by a lateral slot extending partially across said pedal; an outer end of said spring portion having an abutment member extending upwardly of the pedal surface on at least one side thereof; a plate being attached to or formed with the underside of the shoe; at least two spaced apart and recessed rabbets, being integrally formed with said plate; a corner of said plate being formed with a cut out portion; the arrangment being such that on a downward and partial inward pivotal movement of the shoe, relative to the pedal, the spring portion and abutment member are partially depressed, this allowing the lugs to releaseably engage within the rabbets; the resilient spring portion thereafter returning the abutment member to engage with said cut out portion and against a side of the said plate; positive and predetermined movement of said shoe outward of said pedal, causing a depression of said abutment member to allow continued outward movement of the shoe and consequential disengagement of said lugs and rabbets.

BRIEF DESCRIPTION OF THE DRAWINGS

The invention will now be described in detail with reference to the accompanying drawings wherein.

DETAILED DESCRIPTION

Figure 1:
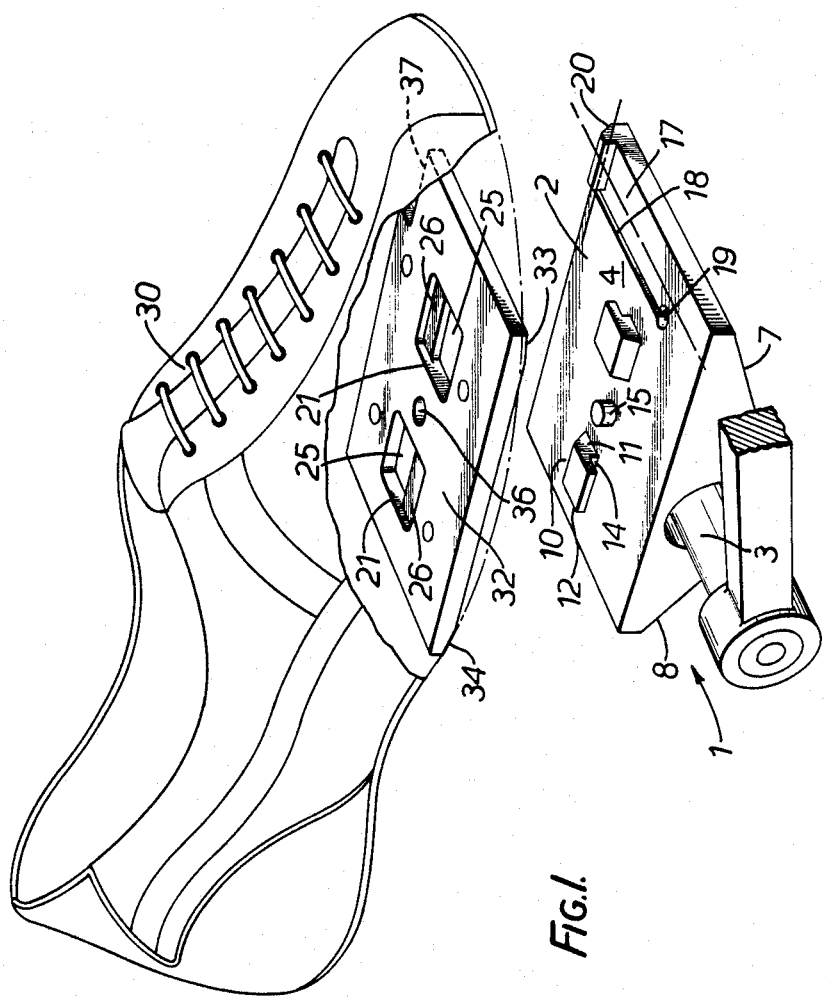
FIG. 1 is a perspective view of a shoe and pedal arrangement according to one form of the present invention.
Figure 2:
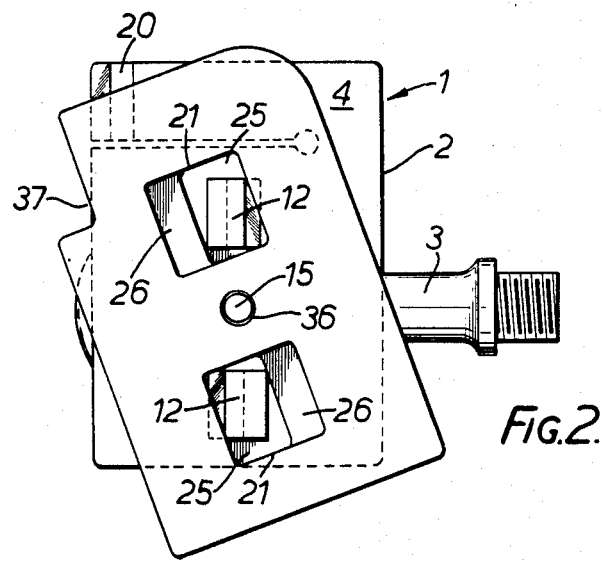
FIG. 2 is a plan view of a shoe plate being attached to a pedal according to one form of the present invention.
Figure 3:
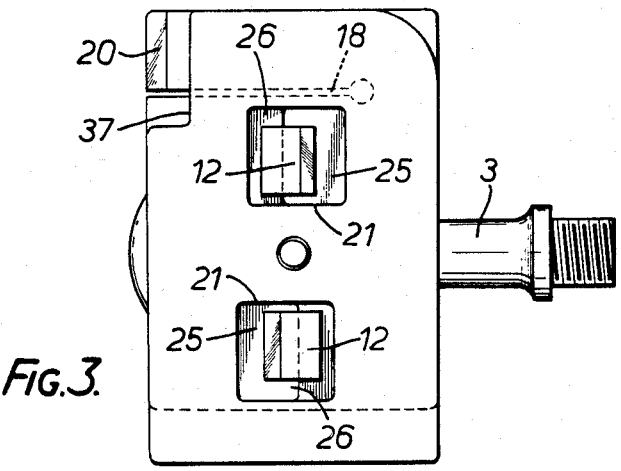
FIG. 3 is a plan view of the shoe plate attached to pedal according to one form of the present invention.
Figure 4:
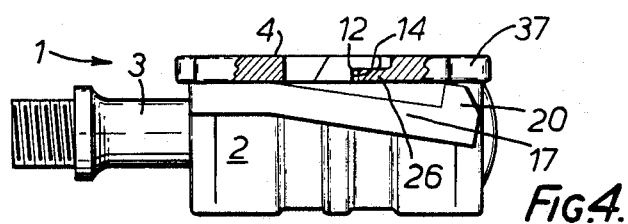
FIG. 4 is a front view of the shoe plate being disengaged from pedal (with spring portion and abutment member depressed) according to one form of the present invention.

The invention relates to the attachment of a cycling shoe, (hereinafter referred to as a "shoe"), to a pedal of a bicycle (hereinafter referred to as "a pedal"). As will be appreciated from the following description, the shoe plate 32 can be attached to, or be formed as part of, an underside of a shoe 30. The plate 32 is shown in more detail in FIGS. 2 through 4 of the drawings, for ease of reference.

The pedal 1 of the present invention includes a main body portion 2 which is mounted on an appropriate spindle 3 which in turn is attached to the pedal arm of a cycle. The body portion 2 preferably has a flat upper surface 4, and angled or profiled leading and rearward lower faces 7 and 8 so that the pedal is as streamlined as possible, especially for use in racing, touring and the like. The body portion 2 is preferably formed of an appropriate lightweight rigid material, for example an appropriate plastics material. As will be appreciated an elongate, transverse bore is provided through which the spindle 3 of a pedal can pass.

The bore is preferably in one form of the invention offset towards one end of the pedal 1, so that in 'non-use', one end thereof will depend downwardly from the spindle. This is by way of example only however.

The upper surface 4 of the body portion 2 is substantially planar in formation and is provided with engagement means which are adapted to engage with appropriate cooperating engagement means provided on the sole of a shoe (to be described hereinafter). The pedal engagement means are preferably in the form of upwardly extending lugs 10 which have a main body portion 11 and at least one outwardly extending lip 12. The lips 12 extend outwardly from upper ends of the body portions 11 so as to define channels 14 therebelow.

The pedal engagement lugs 10 are preferably longitudinally spaced apart on the upper surface 4 of the body portion. The lugs are preferably disposed in a substantially "fore and aft" arrangement, each being substantially offset to opposing sides of the longitudinal axis of the body portion. The lugs 10 are preferably so positioned that the lips 12 face or extend outwardly in substantially opposite directions and so that the channels 14 defined by the body portion and lips of the lugs extend in different directions, and face opposing sides of the body portion. It will be appreciated hereinafter that this is for the purposes of engagement of the pedal with a cycle shoe.

Preferably, in order to assist in the location of a cycle shoe relative to a pedal, a locating pin or similar member 15 is provided substantially medially of the body portion of the pedal. As shown in the accompanying drawings, the pin 15 is preferably substantially intermediate the lugs 10. This will be described hereinafter.

At one end of the body portion 2 a spring portion 17 is formed. The spring portion 17 is elongated in formation and is formed and defined by an elongate and partial slot 18 extending partially across and adjacent one end of the body portion 2. The slot 18 preferably terminates in a hole or bore 19 extending through the pedal, which will assist in preventing splitting of the body portion 2 on pressure being applied to the spring portion 17. The spring portion 17 is thus formed by the transverse slot 18 and the spring portion has a normal orientation or position in which it is substantially normal to the remainder of the surface 4 of the pedal. The properties of the material of the present invention and/or the formation of the slot will render the spring portion inherently resilient and spring biased, allowing it to move into and out of, its position of normal orientation.

The outer end of the spring portion 17 is preferably formed with an upwardly extending abutment member or ridge 20, which is integrally formed with the pedal and spring portion.

In the preferred form of the invention, as shown in the accompanying drawings, the cycle engagement means are formed or provided in a plate 32 of an appropriate material (such as plastic or some other light and appropriate material), which is attached by suitable means to an underside of the shoe. For example by mounting members, pins, screws, adhesives, molding and the like. Alternatively such a plate 32 can be molded into the lower surface or sole of a shoe during formation.

The plate 32 has leading and trailing lower edges 33 and 34 which correspond substantially with the leading and trailing lower edges 7 and 8 of the body portion 2 of a pedal 1, so that once the shoe and pedal are engaged one with the other, the angled and profiled surfaces of the body portion 2 of the pedal 1 will continue up into the plate 32 of the shoe 30.

The shoe engagement means are in the form of spaced apart rabbet recesses 21, of a substantially rectangular formation, each of which include a partially open portion 25 and a recessed tongue 26. The rabbets 21 are longitudinally spaced apart one from the other and are so located that on a shoe 30 being placed over the pedal 2, the open portions of the rabbets 21, are able to align with and are capable of substantially fitting over and engaging with, the lugs 10 of the pedal 1. As shown in the accompanying drawings, a hole or bore 36 is provided in the underside of the shoe 30, substantially intermediate the rabbets 21, which hole or bore 36 will align with and accommodate the pivot pin 15 of the pedal. This will be described hereinafter.

At a corner of the plate 32 there is a stepped or cut out portion 37 which in use will engage with and behind the abutment member 20 of the spring portion 17 of the pedal 1. Again this will be described hereinafter.

In use, the shoe 30 is fitted to a wearer and is placed over the pedal 1. The shoe 30 is then brought down at an angle, so that the locating pin 15 of the pedal 1 is positioned within the hole or bore 36 of the plate 32 of the shoe 30. The longitudinal axis of the shoe 30 and plate 32 is then disposed at a substantially oblique angle to the longitudinal axis of the pedal 1. In this position, the abutment member 20 is upstanding and will prevent an inward and semi-rotational movement or pivot of the shoe and plate, inwardly of the pedal 1. Thus, a slight downward pressure or moment is applied at the front of the shoe 30 and plate 32 this depressing the spring portion 17 and abutment member 20, and allowing the shoe 30 and plate 32 to move inwardly, pivoting about the pin 15 of the pedal 1. The longitudinal axes of the shoe 30 and pedal 1 are thus substantially aligned, and during the pivotal movement the lugs 10 engage within respective rabbets 21, the lips 12 of the lugs engaging over the tongues 26 of the rabbets, so that in effect the tongues 26 of the rabbets are engaged within the channels 14. Once the side of the plate 32 has passed over the abutment member 20, the spring portion 17 and abutment 20 will flex upwardly and return to their normal orientation in which the spring portion 17 is substantially normal to the top surface 4 of the pedal 1. In this position the abutment member 20 will be extending upwardly from the top surface 4 of the pedal 1 and will engage against the side of the stepped or cut out portion 37 at the front side of the plate 30.

This engagement therefore provides a positive engagement between the pedal 1 and shoe 30; the abutment member 20 prevents or at least minimizes casual, involuntary, or unintentional disengagement of the shoe 30 from the pedal 1. The spring portion 17 resiliently retains the abutment member 20 in its upwardly extending position in which it assists in holding the plate 32 and shoe 30 in position.

The plate 32 attached to, or forming part of, the underside of the shoe 30 is a unitary and integral formation, the rabbets and cut out portion, together with the hole substantially medially thereof, being integrally formed as a unitary structure. This will be described hereinafter with reference to the inter-engagement of the cycle shoe and pedal. It should be appreciated however, that on a downward pressure being applied to the abutment member 20 and the spring portion 17, they will, due to their resilience, move or be biased downwardly away from the normal plane of the upper surface 4 of the pedal. In its normal position, the abutment member 20 will extend upwardly from the surface 4 of the pedal, on at least one side thereof. On downward pressure being applied thereto (or being applied to the spring member), the abutment member 20 will move out of and downwardly from that position.

It is envisaged that other forms of the invention, a plurality of such spring members and abutment members may be provided. In the preferred form of the invention shown in the accompanying drawings, the abutment member 20 extends across the width of the formed spring portion 17. It can however be of other dimensions if desired.

In the preferred form of the invention, the components of the pedal are integrally formed one with the other and are formed as a substantially unitary formation. This therefore provides a straight forward and efficient pedal for use in conjunction with the present invention and which overcomes the need to have replacement parts and separate moldings and processes for manufacture and assembly. As indicated earlier, the leading and trailing faces 7 and 8 of the body portion 2 are angled and profiled so as to be as light and aerodynamic as possible.

Referring now to the cycle shoe 30, shown in the accompanying drawings, engagement means can be provided on a sole or lower surface thereof, in the form of recesses 21 which are adapted to engage with the lugs 10 of the pedal 1.

Thus, there are no separate integers which require maintenance, replacement or the like. The formations also permits straight forward and efficient molding and preparation. As indicated hereinbefore, the plate 32 is profiled such that it does not create a resistance during movement of the pedals and cycle; indeed at least the forward or leading edge 33 is profiled and angled so as to connect with and continue the angled profile of the leading or front edge 7 of the pedal 1. The plate 32 is also of a relatively thin nature, having a flat, planar, lower face, which does not have components or integers extending downwardly therefrom. Thus, where it may extend downwardly slightly from a normal underside or sole of the shoe, this is only for a short distance and does not make it difficult for a cyclist to walk following dismounting from a cycle or an accident.

When it is desired to dismount a cycle, or to disengage a shoe from the pedal (such as in the case of an accident or the like), a substantially reverse operation to that outlined above is undertaken. It should be appreciated however, that casual or involuntary movement is unlikely to result in disengagement. It is necessary that there be a positive, intentional and predetermined movement of the foot and shoe away from the pedal, before there is disengagement between the shoe and pedal. Thus, in the preferred form of the invention as shown in the accompanying drawings, a cyclist applied a outward, pivotal moment or movement to a foot and shoe 30, this being a predetermined and positive movement which must be of sufficient pressure to cause the spring portion 17 and abutment member 20 to flex and bias downwardly, this bringing the abutment member 20 out of engagement with the side of the plate 30 defined by the stepped or cut out portion 37. This then allows continued pivotal movement of the shoe 30 outwardly of the pedal so that the lugs 12 and rabbets 21 disengage one from the other. Following such disengagement, the spring portion 17 and abutment member 20 will return to their position of rest.

The present invention has been described by way of example only, as having two spaced apart lugs and two spaced apart rabbets. This is particularly advantageous given the pivotal and semi-rotational moment to be applied to the shoe 30 to allow for the engagement and disengagement operations. However, if desired, other configurations or numbers of engagement means can be provided. As indicated hereinbefore, it is particularly advantageous that the components of the present invention be of a basically unitary and integral construction, this overcoming or minimizing the problems that have been created up until this time, especially with arrangements which have incorporated a plurality of different components, (this in turn creating problems with manufacture, use, repair and replacement). The present invention also provides for an arrangement whereby a positive location is possible between a shoe and pedal, but whereby disengagement is possible in an equally straight forward and efficient manner, on a positive and predetermined movement of the shoe relative to the pedal. The construction and operation of the invention are straight forward and efficient, and provide a substantial advantage over those arrangements that have been known and suggested up until this time. The engagement means incorporated into the shoe 30 of the present invention do not present obstructions or integers which extend outwardly and downwardly from the shoe, such as to make it difficult or impossible for a cyclist to walk having come off or dismounted a cycle. The present invention therefore provides a substantial advantage over the arrangements suggested and disclosed up until this time.

It will be appreciated from the above that the present invention has been described by way of example only and that improvements and modifications may be made thereto without departing from the scope or spirit thereof, as defined by the appended claims.

I claim:

1. A combination of a cyclist's shoe with a cycle pedal wherein said pedal has an upper face juxtaposed in use with the underside of said shoe comprising:

spaced apart engagement means on said shoe and on said pedal to allow for releasable engagement of said shoe with said pedal;

said spaced apart engagement means on said pedal comprising longitudinally spaced apart lugs formed on said pedal and extending upwardly from the supper face of said pedal;

resilient retaining means formed on said pedal comprising, an elongate spring portion located adjacent an end of said pedal and being spaced apart from said engagement means on said pedal, said spring portion being partially defined by a lateral slot which extends partially across said pedal, and an upstanding abutment member on an outer end of said spring portion extending upwardly from the upper face of the pedal on at least one side thereof;

said pedal, resilient retaining means and abutment member being a one-piece member;

a unitary plate on the underside of said shoe; and said spaced apart engagement means on said shoe comprising at least two spaced apart recesses integrally formed in said plate and adapted to receive said lugs therein;

so that when the pedal and shoe are juxtaposed, a downward and partially inward pivotal movement of the shoe relative to the pedal depressed the spring portion and abutment member allowing inward member of the shoe toward the pedal and engagement of the lugs in said recesses, the resilient spring portion thereafter returning the abutment member to a position in which it extends upwardly from the upper face of said pedal to engage a side of said plate to inhibit inadvertent disengagement of said shoe away from and relative to said pedal, and positive and predetermined outward movement of said shoe relative to said pedal causes depression of said abutment member to allow continued outward movement of the shoe relative to the pedal and consequential disengagement of said shoe from said pedal.

2. An arrangement as claimed in claim 1 and further comprising:
a locating pin extending upwardly form said upper face of and as a part of said one-piece pedal substantially intermediate said spaced apart engagement means.

3. An arrangement as claimed in claim 2, wherein:
a locating bore is provided in the underside of said shoe substantially intermediate said spaced apart engagement means for receiving said locating pin in use.

4. An arrangement as claimed in claim 1, wherein:
said spring portion is provided at an end of said pedal, said abutment member and said spring portion having longitudinal axes which are substantially transverse with respect to each other; and
said abutment member extends upwardly from said upper face of said pedal for substantially the width of the spring portion.

5. A cycle pedal adapted for releasable engagement with an underside of a cyclist's shoe, wherein said pedal has an upper face having spaced apart engagement means thereon which are adapted in use to releasably engage with engagement means provided on the underside of said shoe, comprising:
an elongate lateral slot extending partially across said pedal;
resilient retaining means on said pedal comprising an elongate spring portion partially defined by said elongate slot and having an outer free end, and an upstanding abutment member spaced apart from said engagement means on said pedal and located on said outer free end of said spring portion and extending therefrom adjacent an edge of the pedal so that said abutment member in its normal orientation protrudes upwardly and away from said upper face of the pedal on at least one side thereof;
said pedal, resilient retaining means and abutment member being a one-piece member;
the arrangement being such that in use and when the pedal and shoe are juxtaposed, a downward and partially inward pivotal movement of the shoe relative to the pedal depresses said abutment member allowing inward movement of the shoe toward the pedal and engagement of respective engagement means of said pedal and said shoe;
said abutment member thereafter returning to a position in which it extends upwardly from the upper face of the pedal on at least one side of said shoe so as to inhibit inadvertent disengagement of said shoe away from and relative to said pedal; and
positive and predetermined outward movement of said shoe relative to said pedal causing depression of said abutment member to allow continued outward movement of the shoe relative to the pedal and consequential disengagement of said shoe from the pedal.

6. An arrangement for the engagement of a cyclist's shoe with a cycle pedal, said pedal having an upper face with which an underside of said shoe is, in use, juxtaposed, said upper face of said pedal including spaced apart engagement means which are adapted in use to releasably engage with engagement means provided on the underside of said shoe;
said pedal further comprising resilient retaining means comprising an elongate lateral slot extending partially across the pedal, an elongate spring portion partially defined by said elongate slot and having an outer free end, and an upstanding abutment member spaced apart from said engagement means on said pedal and located on said outer free end of said spring portion and extending therefrom adjacent an edge of the pedal so that said abutment member in its normal orientation protrudes upwardly and away from said upper face of the pedal on at least one side thereof;
said pedal, resilient retaining means and abutment member being a one-piece member;
the arrangement being such that in use, and on juxtaposition of said pedal and shoe, a downward and partially inward pivotal movement of the shoe relative to the pedal depresses the abutment member thus allowing inward movement of the shoe toward the pedal and engagement of respective engagement means of said pedal and shoe;
said abutment member thereafter returning to a position in which it extends upwardly from said face of the pedal on at least one side of said shoe such as to inhibit inadvertent disengagement of said shoe away from and relative to said pedal;
positive and predetermined outward movement of said shoe relative to said pedal causing depression of said abutment member to allow continued outward movement of the shoe relative to the pedal and consequential disengagement of said shoe from said pedal.

7. An arrangement as claimed in claim 6, wherein said spaced apart engagement means comprise:
at least two lugs extending upwardly from said upper face of and as parts of said one-piece pedal and being substantially longitudinally spaced apart with respect to each other.

8. An arrangement as claimed in claim 6 and further comprising:
a locating pin extending upwardly from said upper face of and as a part of said one-piece pedal substantially intermediate said spaced apart engagement means.

9. An arrangement as claimed in claim 8, wherein:
a locating bore is provided in the underside of said shoe substantially intermediate said spaced apart engagement means for receiving said locating pin in use.

10. An arrangement as claimed in claim 6, wherein:
said spring portion is provided at an end of said pedal, said abutment member and said spring portion having longitudinal axes which are substantially transverse with respect to each other; and
said abutment member extends upwardly from said upper face of said pedal for substantially the width of the spring portion.

11. An arrangement as claimed in claim 6, wherein said spaced apart engagement means comprises:
recesses in the underside of said shoe adapted to be releasably engageable with engagement means on the pedal.

12. An arrangement as claimed in claim 6, wherein:
said engagement means on said shoe comprises a profiled plate on an underside of said shoe; and
a cut out portion is provided in a corner of said plate which in use engages with the inner side of said abutment member facing inwardly of said pedal.

13. An arrangement as claimed in claim 6, wherein:

said engagement means on said shoe comprises spaced apart, recessed rabbets, each including a partially open recess portion and a tongue portion; and the engagement means on said pedal engages with said rabbets.

14. An arrangement as claimed in claim 6, wherein: said engagement means on the shoe are integrally formed in a unitary, profiled, plate on the underside of said shoe.

* * * * *